Feb. 27, 1962     H. HUBBELL ET AL     3,023,395
ELECTRIC POWER OUTLET
Filed Jan. 24, 1957
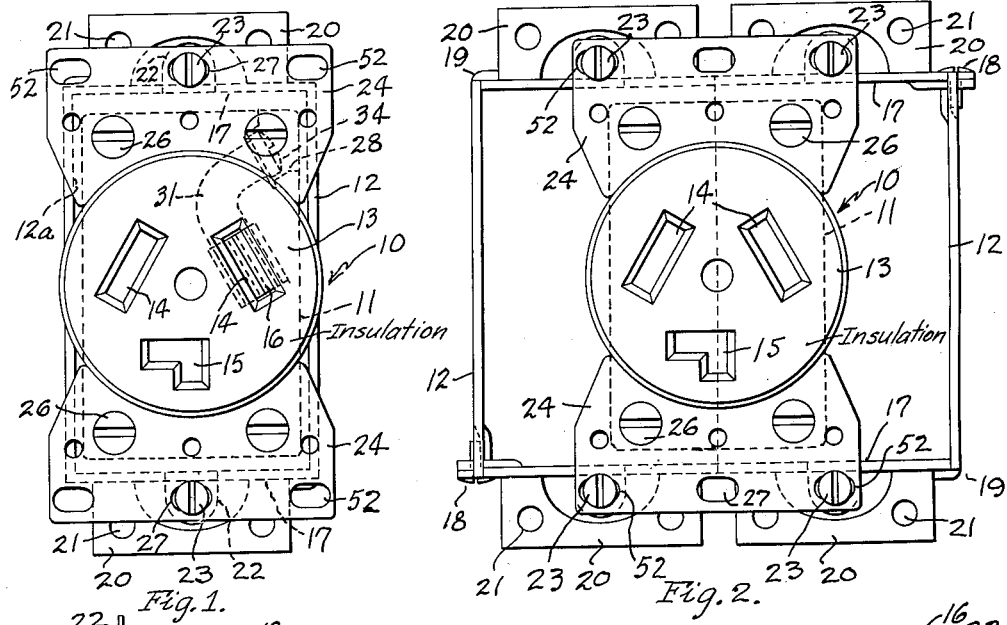
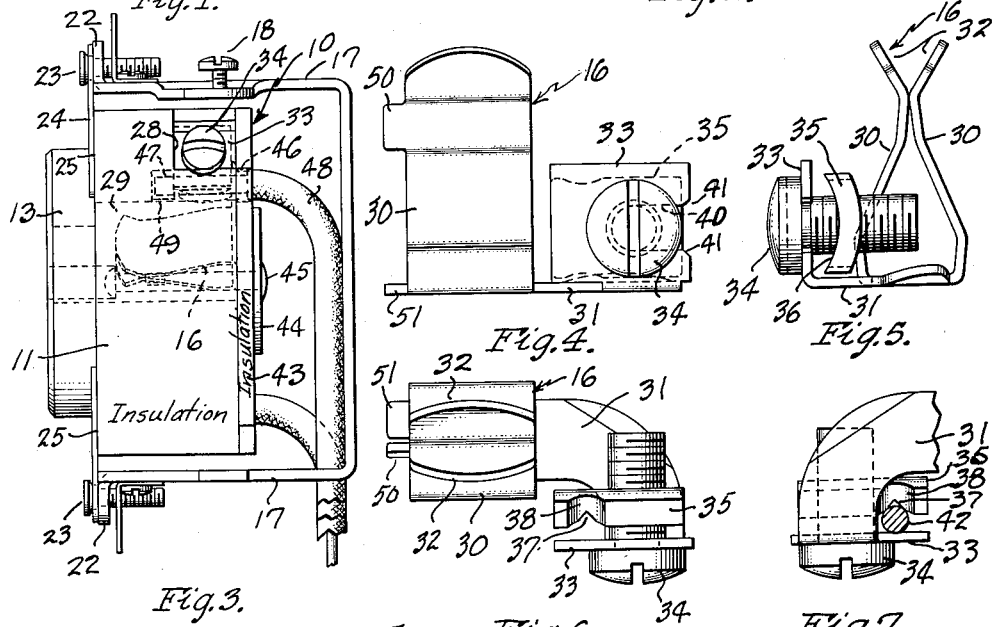
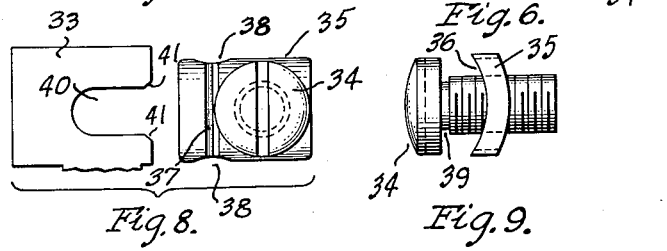
INVENTORS
Harvey Hubbell
BY Ernest R. Carlson
Wooster & Davis
ATTORNEYS.

United States Patent Office 3,023,395
Patented Feb. 27, 1962

3,023,395
ELECTRIC POWER OUTLET
Harvey Hubbell, Southport, and Ernest R. Carlson, Fairfield, Conn., assignors to Harvey Hubbell, Incorporated, Bridgeport, Conn., a corporation of Connecticut
Filed Jan. 24, 1957, Ser. No. 636,143
10 Claims. (Cl. 339—191)

This invention relates to electric wiring devices, such, for example, as power outlets or switches, and has for an object to provide an improved means for connecting the lead wires from the house wiring system to the contacts of these devices.

It is another object to provide such connection for the lead wires which may be used with power outlets or switches to permit the mounting of such devices in a single gang standard wall outlet box without danger of the head of the binding screws shorting on the box.

It is a further object to provide such a connection for fastening lead wires to a connection including a supporting plate for a binding screw, which is so constructed that in retracting or loosening the screw its head does not move away from the plate but remains fixed at one side thereof, while there is a clamping nut on the screw on the other side adapted for clamping the wire to that side of the plate upon tightening of the screw.

With the foregoing and other objects in view, we have devised the construction illustrated in the accompanying drawing forming a part of this specification. It is, however, to be understood the invention is not limited to the specific details of construction and arrangement shown, but may embody various changes and modifications within the scope of the invention.

In this drawing:

FIG. 1 is a front view of a power outlet receptacle involving the invention shown applied to a standard single gang wall outlet box;

FIG. 2 is a similar view showing how it may be applied to two of these boxes arranged side by side;

FIG. 3 is a side view looking from the right of FIG. 1 but with the adjacent side of the wall box removed;

FIG. 4 is an enlarged side view of one of the contacts;

FIG. 5 is an end view thereof looking from the right of FIG. 4;

FIG. 6 is a view looking down on the top of FIG. 4;

FIG. 7 is a view looking from the opposite side of FIG. 6 and showing the lead wire in section clamped in position;

FIG. 8 is a view of a portion of the contact and the clamping nut and screw separated therefrom, and FIG. 9 is a view of the clamping screw and nut looking from the right of FIG. 8.

The invention as shown comprises an electric power outlet or receptacle 10 designed to carry sufficient load to supply current to an electric range, an electric drier or similar devices, such devices requiring considerable load, such, for example, as up to thirty amperes or more at 250 volts. As shown in FIG. 1, such a device comprising a substantially rectangular body portion 11 of molded insulating material is of a size to nearly fill the compartment in the single gang wall outlet box 12, it being apparent that the side walls of this body 11 are closely adjacent the inner sides 12a of the side walls of box 12. The outlet also includes a circular front boss or face 13 including the elongated slots 14 and the angular shaped slot 15 for the contacts of an attachment plug cap (not shown) to be inserted to engage the contacts in this receptacle or outlet for supplying current to the electric device, such as the stove, drier or other device to which the cap is connected. These single gang boxes 12 are of a standard size, and it is one of the objects of this invention to provide an improved means for connecting the lead wires from the house wiring system to the contacts of this outlet without danger of their being grounded on the box by the binding screw of the connecting means, to thus permit the use of this device in the standard single gang wall outlet box, without requiring the tearing out of such box and installing a double gang box when this outlet is to be installed in the system and in the wall near it for use of the electrical device.

Although the invention is described and shown as applied in a receptacle or outlet, it is to be understood it is equally applicable to a switch for controlling the current supplied to these electrical devices, and adapted to be mounted in a single gang wall box.

In FIG. 1, one of the receptacle contacts back of the elongated slots 14 is shown at 16. There will be a similar contact back of the other slot, and an appropriately shaped grounding contact back of the angular shaped slot 15. The box 12 comprises side walls and end walls 17 and it is a common construction of these boxes to provide detachable means 18 and 19 for permitting removal of the sides of the box if it is desired to use two or more together, as shown in FIG. 2. They are provided at their opposite ends with plates 20 provided with screw holes 21 for mounting the box in an opening in the wall of the room or other location, and they are provided with lugs 22 provided with tapped holes to receive the securing screws 23 for the electric wiring device to secure it over the open face of the box. In the outlet shown there is a pair of metal plates 24 secured to the face 25 of the body 11 set back from the face of the circular boss 13 and secured thereto by the screws 26, there being one of these plates at each of the opposite ends of the insulating body 11 and each provided with an elongated opening 27 to receive the screws 23 for fastening to the ears 22 of the wall box.

The power outlet as shown comprises recesses 28 adjacent the upper corners leading inwardly from both the end and the side walls and communicating at one side with the chamber 29 in the body in back of each of the slots 14 to receive the receptacle contact 16. Each of these contacts comprises a pair of spring fingers 30 arranged side by side and mounted on a connecting plate 31, these spring fingers preferably being integral with this plate and bent upwardly from the side edges thereof with their free ends inclined outwardly, as indicated at 32, to lie back of the inlet slot 14 and guide a blade contact inserted in this slot to a position between the spring fingers 30, these fingers being yieldable to permit this action.

The connecting plate 31 is curved from the contact fingers 30, and at its free end is bent laterally to form a base or supporting plate 33 to support the binding screw 34 and the lead wire clamping nut 35 threaded on this screw. This nut is curved in cross section, as shown in FIGS. 5 and 9, so that it has a concave side 36 facing the back of the plate 33 in which the screw is mounted, and at one side of the screw it has a transverse V-shaped channel or groove 37 in this concave face. It also preferably has transverse notches 38 in its opposite edges leading to this groove to assist in guiding the lead wire to a position between this plate 33 and in the groove 37. The screw 34 is mounted in the plate 33 so that it is held against longitudinal movement while permitting rotary movement, but also is so mounted that the screw and the nut may be removed from the plate if desired. For this purpose the screw is provided with a reduced neck or groove 39 immediately under the head adapted to slide into a channel or notch 40 leading inwardly from one side edge of the plate 33, the threaded shank of the screw being of larger diameter than the width of this notch or channel, but this channel being wide enough to receive the reduced neck 39 by sliding this screw into this notch through the open end thereof to the position shown in FIGS. 4 and 5. The entrance edges of the notch 40 are preferably inclined as shown at 41 to assist in guiding the screw into this notch. Thus it will be seen that when the screw is in position the head is at the outer side of the plate 33, while the clamping nut 35 is on the opposite side of the plate, and although the screw is turned in the slot 40 it will be held against longitudinal movement therein by the side edges of this slot being seated in the groove forming the reduced neck 39. However, rotary movements of the screw will shift the clamping nut 35 toward or from the other side of the plate 33 to permit clamping of the lead or conductor wire 42 between this nut and the inner surface of the plate 33, as indicated in FIG. 7, and with this wire seating in the V-shaped groove 37 in the nut. It will be seen from FIG. 6 that the nut is elongated to one side of the screw to permit forming of this groove, but that the groove is located closely adjacent to the shank of the screw so that clamping action of the nut on the wire is close to the screw. The curved shape of the nut with its concave side facing the inner side of the plate 33 provides somewhat sharper edges at the opposite ends of the groove 37 to increase the grip on the wire.

The chamber 29 in which the contact 16 is located opens through the back of the body member 11 and there is a recess in this back wall between the chamber 29 and the recess 28 in which the connecting plate 31 is seated, permitting the plate 33, the binding screw and the nut to be located in the recess 28. After these elements are placed in the body its rear wall is covered with an insulating plate 43 secured by a washer 44 and a rivet 45 extending through the body from a recess in the front wall thereof. The plate 43 is provided with an opening 46 in alignment with the groove 37 and the space between the nut and the plate 33, for entrance of the stripped end 47 of an insulated lead wire 48 extending into the box from the house wiring system. The insulating body 11 is also provided with a socket or recess 49 in alignment with this opening 46 in the bottom of the recess 28 to receive the free end of this lead wire and limit the inward movement thereof and also to assist in locating it in alignment with the V-shaped groove 37. After the stripped end of the wire is so inserted, tightening up of the screw 34 will draw the nut 35 forwardly and tightly clamp the stripped end of the lead wire against the inner surface of the plate 33 and between this plate and the nut in the groove 37 to effect an effective electrical connection as well as provide a tight, firm grip on the wire to secure it properly to the fixture.

It is preferred to provide locating lugs 50 and 51 on the edges of the contacts and connecting plate 31 to assist in properly locating the contact in the insulating body member.

It will be apparent from this construction that although this power outlet with the necessary current capacity comprises a larger body than the ordinary wall outlet, and thus fills a greater portion of the space within the standard single gang wall box 12, and brings the binding screws 34 into closer relation with the side walls of this box, this improved connection, by which the wires may be secured to and connected with the receptacle contacts without shifting the heads of the screws outwardly in loosening them or making the connection of the lead wires thereto, will prevent any danger of the heads of the screws being shifted outwardly to form a short against the walls of the box under any circumstances. Also the wire is located on the inner side of the plate 33 carrying the binding screw and is clamped on the side of this plate by the clamping nut so that there is no danger of this wire shifting outwardly to engage the wall box, even should the connection become loose.

Although this outlet is shown in FIG. 1 as mounted in a single gang wall box, and an object of the invention is to provide a construction whereby it may be mounted in such box, still it may be mounted in a double gang or double arrangement of these boxes, as shown in FIG. 2. For this purpose the end plates 24 are made of sufficient width to carry additional elongated slots 52 at the opposite ends thereof, in alignment with the lugs 22 of two boxes 12 arranged side by side with their adjacent side walls removed, and permit mounting of this fixture in these boxes with the securing screws 23 extending through these slots and into the ears 22.

From the above it will be seen that this improved means for connecting the lead wires to the contacts in the electrical fixture, either an electric power outlet or a power control switch, permits the location of the head of the binding screw relatively close to the other elements, which would not be allowed or would be objectionable if the screw were mounted in the usual manner so that the head moves outwardly as the screw is loosened to permit winding of the wire around the shank of the screw under the head of the screw; also that the wire is clamped on the opposite side of the plate carrying the screw so that it is located at a greater distance from elements on the same side as the head of the screw, and is retained against liability of contact with these elements should it become loosened.

Having thus set forth the nature of our invention, we claim:

1. A contact for an electric wiring device comprising: a contact portion; a stationary flat supporting plate connected thereto; said plate having a plain opening extending therethrough; a unitary screw supported by said plate and having a head on one side of said plate and a threaded shank extending through the opening; said shank having an annular groove immediately under said head in which the peripheral edge portions of said plate that surround the opening are seated to prevent axail movement while permitting turning movement of said screw relative to said plate; a clamping nut having a threaded opening threaded on said shank and disposed on the side of said plate which is opposite to the side on which said head is disposed for travel thereon, said clamping nut being plate-like and having a straight side edge; and means forming a part of the contact and cooperating with said edge of said clamping nut throughout the total length of travel of said clamping nut on said shank for preventing said clamping nut from rotating on said shank, whereby turning movements of said screw result in axial shifting of said clamping nut on said shank toward or away from said plate, and the bared end of a conductor wire may be clamped between one side of said clamping nut and said opposite side of said plate by disposing it therebetween and turning said screw so as to cause said clamping nut to shift toward said plate.

2. A contact as defined in claim 1 wherein said clamping nut is concavely curved on said one side and has sharp opposite side edges spaced forwardly from the center of said clamping nut toward said plate which are arranged to grip a conductor wire that is clamped between said clamping nut and said plate.

3. A contact as defined in claim 2 wherein said clamping nut includes a straight groove extending transversely of said side edges at right angles thereto which is arranged to seat a clamped conductor wire, and notches at the ends of said groove to guide a conductor wire into said grove.

4. A contact for an electric wiring device comprising: a contact portion; a stationary flat supporting plate connected thereto; said plate having a notch opening through a side edge of said plate; a unitary screw supported by said plate and having a head on one side of said plate and a threaded shank extending through the notch; said shank having an annular groove immediately under said head in which the peripheral edge portions of said plate that form the notch are seated to prevent axial movement while permitting turning movement of said screw relative to said plate and to permit easy mounting of said screw on said plate by sliding it through the open end of the notch with opposite side peripheral edge portions that form said notch seated in the annular groove in said shank; a clamping nut having a threaded opening threaded on said shank and disposed on the side of said plate which is opposite to the side on which said head is disposed for travel thereon, said clamping nut being plate-like and having a straight side edge; and means forming a part of the contact and cooperating with said edge of said clamping nut throughout the total length of travel of said clamping nut on said shank for preventing said clamping nut from rotating on said shank, whereby turning movements of said screw result in the axial shifting of said clamping nut on said shank toward or away from said plate, and the bared end of a conductor wire may be clamped between one side of said clamping nut and said opposite side of said plate by disposing it therebetween and turning said screw so as to cause said clamping nut to shift toward said plate.

5. A contact for an electric wiring device comprising: a flat plate; a contact portion formed at one end of said plate; a flat supporting plate formed at the other end of said plate and extending normal thereto; said supporting plate having a plain opening extending therethrough; a unitary screw supported by said supporting plate and having a head on one side of said supporting plate and a threaded shank extending through the opening; said shank having an annular groove immediately under said head in which the peripheral edge portions of said supporting plate that surround the opening are seated to prevent axial movement while permitting turning movement of said screw relative to said supporting plate; a clamping nut having a threaded opening threaded on said shank and disposed on the side of said supporting plate which is opposite to the side on which said head is disposed; said clamping nut having a straight edge in engagement with a side of said flat plate, whereby turning movements of said screw result in axial shifting of said clamping nut on said shank toward or away from said supporting plate, and the bared end of a conductor wire may be clamped between one side of said clamping nut and said opposite side of said supporting plate by disposing it therebetween and turning said screw so as to cause said clamping nut to shift toward said supporting plate.

6. A contact as defined in claim 5 wherein the opening in said supporting plate is a notch that opens through a side edge of said supporting plate, and said screw is arranged to be mounted on said supporting plate by sliding it through the open end of the notch with opposite side peripheral edge portions that form the notch seated in the annular groove in said shank.

7. An electric wiring device comprising: a body of insulating material having a recess opening through its rear wall and a side wall, and a chamber communicating with said recess; a contact mounted in said body and including a contact portion in said chamber and a flat supporting plate in said recess mounted so as to be stationary relative to said body; said plate having a plain opening extending therethrough; a unitary screw supported by said plate and having a head on one side of said plate which is accessible from the exterior of said body and a threaded shank extending through the opening into said recess; said shank having an annular groove immediately under said head in which the peripheral edge portions of said plate that surround the opening are seated to prevent axial movement while permitting turning movement of said screw relative to said plate; a clamping nut having a threaded opening threaded on said shank and disposed in said recess on the side of said plate which is opposite to the side of said plate on which said head is disposed and inaccessible from the exterior of said body; and means preventing said clamping nut from rotating on said shank, whereby turning movements of said screw result in axial shifting of said clamping nut on said shank toward or away from said plate, and the bared end of a conductor may be clamped between one side of said clamping nut and said opposite side of said plate by disposing it therebetween and turning said screw so as to cause said clamping nut to shift toward said plate.

8. A wiring device as defined in claim 7 wherein said contact includes a flat connecting plate that connects said contact portion and said supporting plate and is arranged to extend parallel to the rear wall of said body; said supporting plate extends normal to said connecting plate; an insulating cover plate is secured to said body to cover the rear wall thereof and has an opening in alignment with the space between said clamping nut and said supporting plate for insertion of a conductor wire; and said body is provided with a positioning socket in an inner wall which forms the recess to receive the free end of the conductor wire, whereby a conductor wire may be inserted through the opening in said insulating plate, through the space between said clamping nut and said supporting plate and have its free end received in said socket to properly position the conductor wire for clamping.

9. A wiring device as defined in claim 8 wherein said clamping nut is concavely curved on its side facing said supporting plate, has opposite sharp side edges spaced forwardly from its center toward said supporting plate which are arranged to grip a conductor wire, has a straight groove extending transversely of said side edges at right angles thereto which is arranged to seat a conductor wire; and has notches at the ends of said groove to guide a conductor wire into said groove, said clamping nut being disposed in said recess so as to have said groove and said notches in alignment with said socket and the opening in said insulating plate.

10. A wiring device as defined in claim 7 wherein the opening in said supporting plate is a notch that opens through a side edge of said supporting plate, and said screw is arranged to be mounted on said supporting plate by sliding it through the open end of the notch with opposite side peripheral portions that form the notch seated in the annular groove in said shank.

References Cited in the file of this patent
UNITED STATES PATENTS

| | | |
|---|---|---|
| 1,268,457 | Haynes et al. | June 4, 1918 |
| 1,557,248 | Gernsback | Oct. 13, 1925 |
| 1,635,200 | Zilliox | July 12, 1927 |
| 1,857,398 | Phillips | May 10, 1932 |
| 1,878,779 | Jung et al. | Sept. 20, 1932 |
| 2,041,613 | Lincks | May 19, 1936 |
| 2,179,753 | Mebold | Nov. 14, 1939 |
| 2,193,691 | Johnson et al. | Mar. 12, 1940 |
| 2,216,740 | Hubbell | Oct. 8, 1940 |
| 2,288,390 | Broverman | June 30, 1942 |
| 2,304,711 | Shenton | Dec. 8, 1942 |
| 2,628,263 | Bulla | Feb. 10, 1953 |
| 2,686,297 | Hutt | Aug. 10, 1954 |
| 2,687,517 | Despard | Aug. 24, 1954 |
| 2,690,545 | Hubbell | Sept. 28, 1954 |
| 2,715,715 | Bentley | Aug. 16, 1955 |
| 2,753,538 | Carlson | July 3, 1956 |

FOREIGN PATENTS

| | | |
|---|---|---|
| 379,828 | Great Britain | Sept. 8, 1932 |
| 393,544 | Great Britain | June 8, 1933 |